US009075412B2

(12) United States Patent
Dixon et al.

(10) Patent No.: US 9,075,412 B2
(45) Date of Patent: Jul. 7, 2015

(54) SELF-PROPELLED ROBOTIC PALLET VEHICLE

(71) Applicant: STRATOM, INC., Boulder, CO (US)

(72) Inventors: Cory Dixon, Boulder, CO (US); Dan Ambrosio, Denver, CO (US); Kevin Van Liere, Louisville, CO (US)

(73) Assignee: Stratom, Inc., Boulder, CO (US)

( * ) Notice: Subject to any disclaimer, the term of this patent is extended or adjusted under 35 U.S.C. 154(b) by 0 days.

(21) Appl. No.: 14/153,744

(22) Filed: Jan. 13, 2014

(65) Prior Publication Data

US 2014/0309809 A1 Oct. 16, 2014

Related U.S. Application Data

(63) Continuation of application No. PCT/US2013/066655, filed on Oct. 24, 2013.

(60) Provisional application No. 61/717,707, filed on Oct. 24, 2012.

(51) Int. Cl.
*G05D 1/00* (2006.01)
*B64D 9/00* (2006.01)

(52) U.S. Cl.
CPC .............. *G05D 1/0022* (2013.01); *B64D 9/003* (2013.01)

(58) Field of Classification Search
CPC .............................. B64C 19/00; G05D 1/0676
USPC .............................................................. 701/2
See application file for complete search history.

(56) References Cited

U.S. PATENT DOCUMENTS

2010/0168934 A1* 7/2010 Ball et al. ........................ 701/2

* cited by examiner

*Primary Examiner* — Mary Cheung
*Assistant Examiner* — Yuen Wong
(74) *Attorney, Agent, or Firm* — Holland & Hart LLP

(57) ABSTRACT

Various aspects of the present disclosure provide a robotic pallet system that provides the ability to move palletized cargo without requiring the use of additional material handling equipment such as forklifts and K-loaders, for example. In some aspects, an integrated system may be used to interact with and control a number of robotic pallets. Such an integrated system may be used to deliver palletized cargo without additional equipment through self-propelled pallets, thereby reducing the number of personnel required to load palletized cargo by reducing the size of the team required to position the pallet inside of the aircraft and removing the need for a k-loader operator.

10 Claims, 9 Drawing Sheets

SELF-PROPELLED ROBOTIC PALLET VEHICLE

FIELD

The present disclosure is directed to material handling systems and, more specifically, to a self-propelled robotic pallet vehicle.

BACKGROUND

Movement of materials and equipment is a significant and important component of any supply and distribution chain. Materials and equipment are routinely required to be transported many times throughout the life cycle of the particular materials and equipment. As such, many transport systems have been developed to help efficiently move items through various different modes of transportation, including transport by road vehicles, rail vehicles, aircraft, and watercraft. One common item in many modes of transport is a pallet that is used to carry equipment and/or materials. Many types of pallets are known, which generally allow for other equipment to efficiently move the pallet. FIG. 1 shows one type of pallet, which is commonly used in military operations, known as a 463L pallet. FIG. 2 shows another type of pallet, which is commonly used in transport of commercial and industrial goods. Of course, many other types of pallets and platforms are commonly used and are well known in the art, such as platforms used in commercial passenger and air freight aircraft. The term "pallet" is used herein to refer to any of the various types of material handling pallets or platforms.

Pallets have widespread use in commercial, industrial, and military operations, and one specific type of system is the military 463L system, which will be used as an example throughout this disclosure with the understanding that the concepts and principles apply equally to any of the various other types of pallets and platforms that may be used in material handling. Standard 463L pallets, as illustrated in FIG. 1, generally require the use of K-loaders and forklifts to move the pallets and load them into and out of aircraft. While the standard 463L pallet provides an efficient cargo handling system in normal operations, the pallet handling itself requires significant support equipment, material handling equipment, and manpower to stage, maneuver, manipulate, and load the aircraft. For example, a forklift or K-loader may be used to position a loaded pallet adjacent to an aircraft, and then multiple personnel may be required to push the pallet up a ramp and into position in an aircraft. In some situations, it may be desirable to reduce the amount of equipment and/or personnel required to move a number of pallets that may be transported as a given time.

SUMMARY

Various aspects of the present disclosure provide a robotic pallet system that provides the ability to move palletized cargo without requiring the use of additional material handling equipment such as forklifts and K-loaders, for example. In some aspects, an integrated system may be used to interact with and control a number of robotic pallets. Such an integrated system may be used to deliver palletized cargo without additional equipment through self-propelled pallets, thereby reducing the number of personnel required to load palletized cargo by reducing the size of the team required to position the pallet inside of the aircraft and removing the need for a k-loader operator.

According to various embodiments, robotic pallets and a robotic pallet system are provided that improve efficiency of a cargo resupply missions by reducing total mission time through reduction in time-to-load and time-to-unload cargo aircraft. The system may reduce the number of personnel required to load pallets into and out of a cargo aircraft, and around and in a warehouse environment. The system may also improve the ability to perform resupply missions to Forward Operating Bases (FOBs) and less accessible locations that do not have material handling equipment (MHE), such as forklifts and K-loaders. The system may also enable the movement of cargo and material around aerial ports, airbases, FOBs and other locations without the use of additional MHE. In some embodiments, robotic pallets are able to operate autonomously or teleoperatively in indoor and outdoor environments, and inside cargo aircraft. Additionally, in some embodiments, robotic pallets include load sensing that may determine the weight and weight distribution characteristics of the pallet and its associated load, and the system may perform more optimal load configuration (e.g., improve location of cargo center of gravity) for specific aircraft, leading to a reduction of total fuel used during flight.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Figure 1:
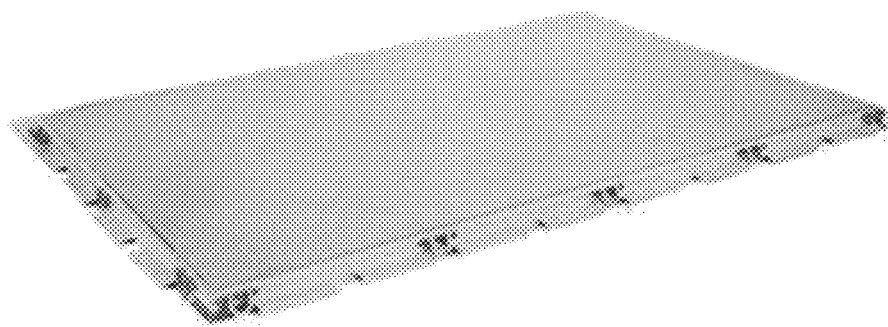
FIG. 1 is an illustration of a prior art pallet, which is commonly used in military operations, known as a 463L pallet.
Figure 2:
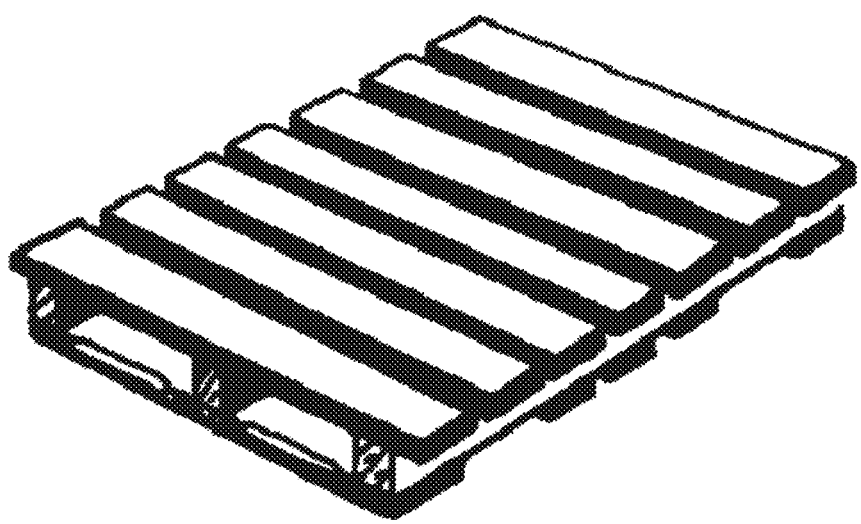
FIG. 2 is an illustration of another prior art pallet, which is commonly used in transport of commercial and industrial goods.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, aspects and elements described with respect to certain embodiments may be combined in various other embodiments. It should also be appreciated that the following systems, devices, and components may individually or collectively be components of a larger system, wherein other procedures may take precedence over or otherwise modify their application.

Various embodiments disclosed herein provide a robotic pallet that is self-propelled and interacts with one or more control systems. The robotic pallet of various embodiments is an electric self-propelled robotic pallet vehicle that is designed to move palletized cargo in airbase/airport environments, and onto/off of cargo aircraft (to include airplanes and vertical lift aircraft) autonomously or teleoperatively (by remote control). In some embodiments, the robotic pallet maintains compatibility with current military 463L and/or the 463L half pallet specifications of a pallet system. Such systems provide an advanced ability to move cargo in congested, dynamic, environments of warehouses and aircraft decks without the use of additional material handling support equipment, such as k-loaders and forklifts. In addition, the robotic pallet, in some embodiments, has the ability to self-weigh and measure the center-of-gravity (CG) of its cargo which will enable a team of pallets to determine a more optimal load configuration for specific aircraft, leading to a reduction of total fuel used during flight. When this reduction of fuel usage is taken over a fleet of aircraft, using the robotic pallet system can facilitate significant fuel savings. The ability to measure a cargo's weight and CG also provides a method of provide tamper detection and load verification, improving overall quality control and verification in automated cargo moving processes.

As mentioned above, various embodiments are described herein with respect to specific mechanical designs to meet 463L cargo handling specifications. However, as will be readily apparent to those of skill in the art, numerous other embodiments may be used with other systems having different cargo handling specifications. In some embodiments, the robotic pallet system utilizes a novel propulsion system to provide holonomic vehicle motion in space constrained environments of warehouses and on aircraft decks for fine position control. Other embodiments provide off-road capable pallets that are able to move palletized cargo in off-road, unimproved environments, in addition to still supporting the ability to load/unload cargo aircraft.

To operate autonomously and safely, the robotic pallet of various embodiments utilizes a suite of sensors to detect its surroundings to include detection of obstacles (to include people, vehicles, boxes, walls, etc.), perform collision avoidance of obstacles, and determine its location indoors, outdoors, and within aircraft. Such sensors may include, for example, positioning sensors, proximity detectors, stereographic imaging sensors, inertial measurement units, LIDAR systems, and 3D TOF cameras, to name a few.

Figure 3:
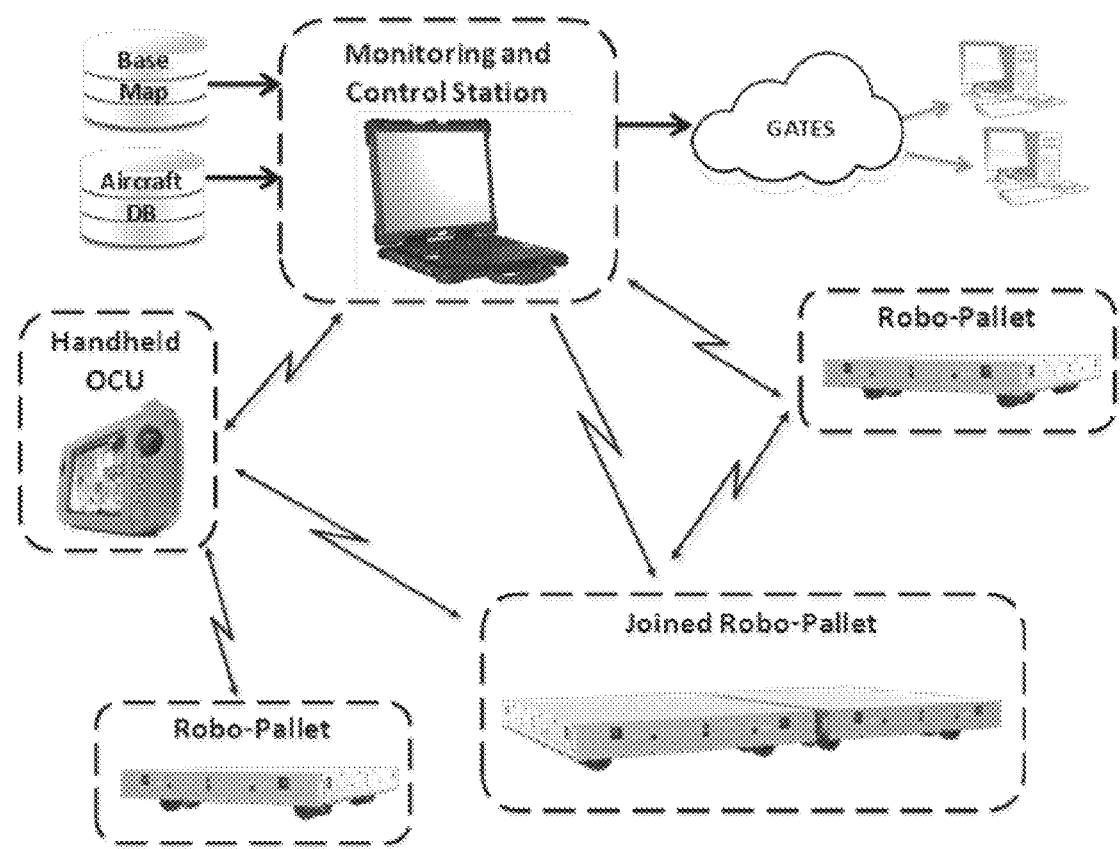
FIG. 3 shows an exemplary architecture of a robotic pallet system of various aspects of the disclosure.

With reference now to FIG. 3, the architecture of the robotic pallet system of exemplary embodiments is a network centric system including monitoring and control station(s), handheld pallet controllers, and the pallets. In some embodiments, an ad hoc wireless network connects the pallets to the central monitoring and control station(s), the handheld controller(s) and other pallets. Using such an ad hoc network enables pallets to communicate with each-other for load configuration and optimization algorithm execution in a cooperative decentralized manner, and provides the benefits of increasing the robustness and operational range of the system. A handheld controller and the central monitoring and control stations may be independent from the pallets, and any handheld pallet controller within the network and may control, operate, and monitor any pallet within the network. Thus such a network may provide inherent robustness and modularity.

Figure 4:
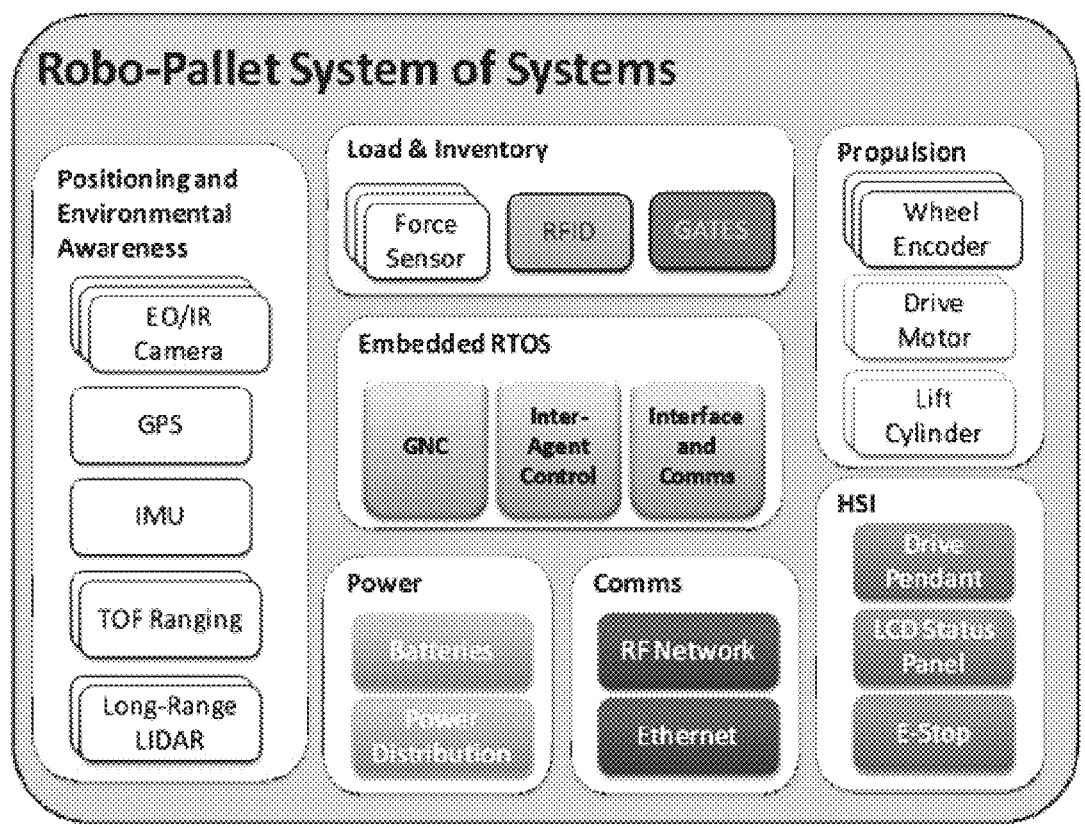
FIG. 4 shows an exemplary integrated sensing system of various aspects of the disclosure.
Figure 5:
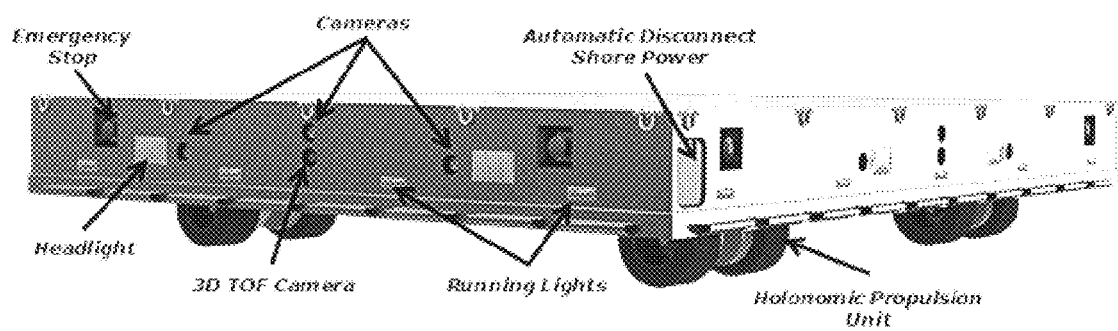
FIG. 5 shows exemplary mechanical aspects of a robotic pallet of various aspects of the disclosure.
Figure 6:
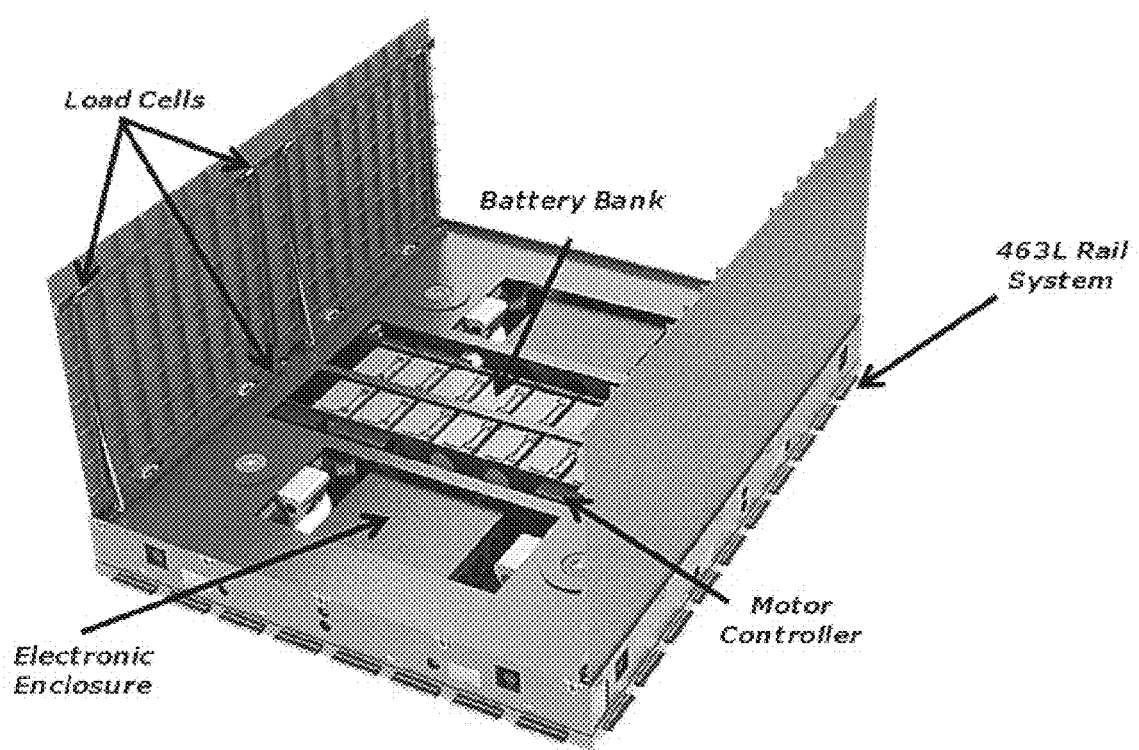
FIG. 6 shows exemplary mechanical aspects of a robotic pallet of various aspects of the disclosure.
Figure 7:
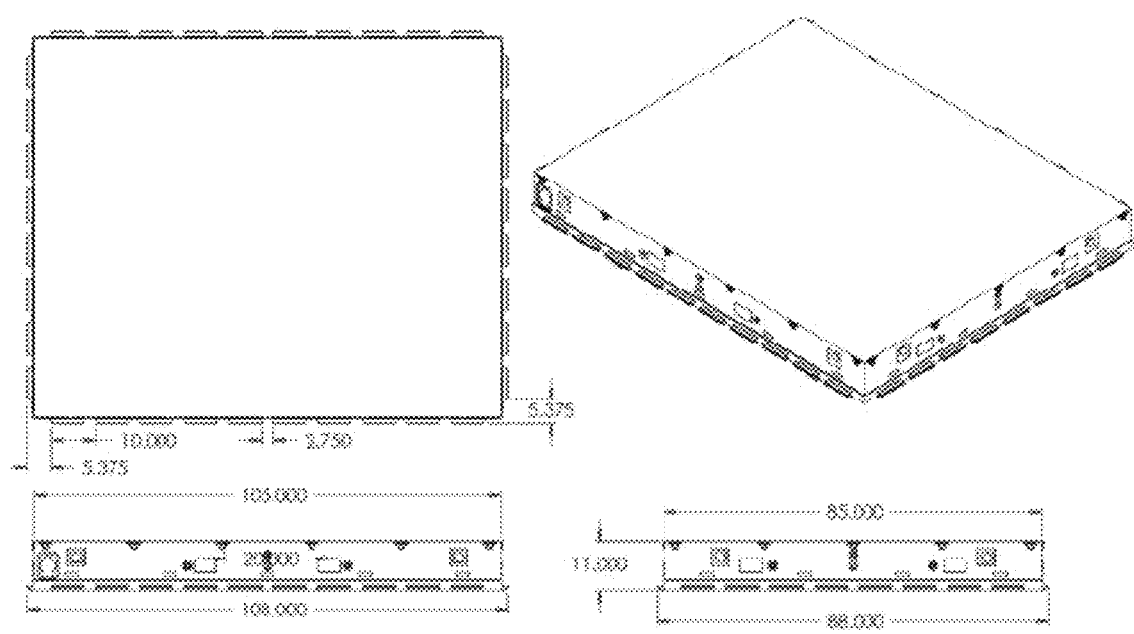
FIG. 7 shows exemplary mechanical aspects of a robotic pallet of various aspects of the disclosure.

As mentioned above, each pallet may include various sensors. With reference now to FIG. 4, an integrated sensing system of some embodiments is discussed. In the example of FIG. 4, the integrated sensing system has been designed which combines information from Electro-Optical/Infra-Red (EO/IR) cameras, range sensors, 3D imaging cameras, an inertial measurement unit (IMU), and GPS to provide the pallet's ability to self navigate from warehouse to aircraft locations, and to perform obstacle detection and avoidance functions. Image processing algorithms enabling route planning and obstacle avoidance functions are used.

According to some embodiments, the robotic pallet has two methods of controlling, monitoring, and operating the pallet, namely a monitoring or control station or a handheld pallet controller. The networked connection to the centralized control and monitoring station may be used to provide centralized health and status monitoring and command and control for a single operator to control and monitor a team of pallets. In addition, the centralized connection may provide a connection to an inventory and tracking database, thereby enabling automated inventory tracking; a benefit of the robotic pallet system. The second method of control is through a handheld pallet controller and is intended for an operator to monitor and control a local pallet, or a local team of pallets. Functionally, the two interfaces may have similar capability, but the interaction and method of control by the operator may be different. The primary difference, according to an embodiment, is that the handheld pallet controller will provide the primary interface for directly driving the pallet by a local operator. Remote driving of the pallet from the central monitoring and control station may also be available.

Figure 8:
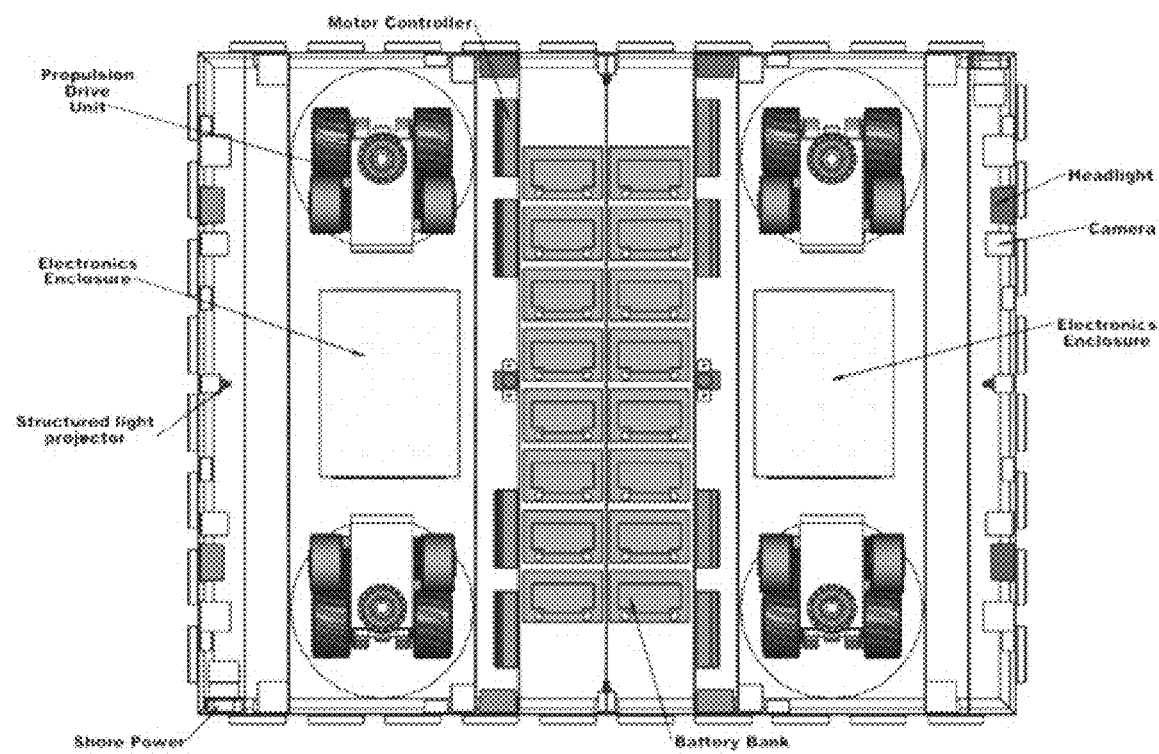
FIG. 8 shows exemplary mechanical aspects of a robotic pallet of various aspects of the disclosure.

With reference now to FIGS. 5-8, mechanical aspects of an exemplary robotic pallet are provided. Each of FIGS. 5 and 6 include callouts of specific components or systems. Mechanical outline drawing of an exemplary robotic pallet concept is shown as a three-view and isometric view in FIG. 7. This particular design, with an 11 inch overall height, fully contains the propulsion system and tires to enable the robotic pallet to raise and lower to its flat bottom. An example of an internal layout is shown in FIG. 8, and shows some internal structure, the propulsion drive units, the hydraulic power system, a battery bank, and the electronic enclosure.

To maintain 463L compatibility, the robotic pallet of the embodiments of FIGS. 5-8 has a flat bottom surface that it will rest on, by retracting drive wheels internally to the pallet. Such a flat bottom surface may provide compatibility with roller and ball systems used in the nominal handling of 463L pallets, and to spread its load on aircraft decks while in flight. Also, the robotic pallet of these embodiments follows the mechanical 463L compatibility requirements as specified in MIL-HDBK-1791 for the rail lockdown system used on Air Force material handling equipment and cargo aircraft.

As mentioned above, a unique capability of robotic pallets of some embodiments is the ability to self-weigh cargo and to measure the cargo's vertical and horizontal CG. To do this, the top deck of the pallet is designed with load cells that may determine a load on the top deck in the area of the load cell.

Such a robotic pallet may use, for example, sixteen different load cells to measure the distributed load on the pallet top deck.

Figure 9:
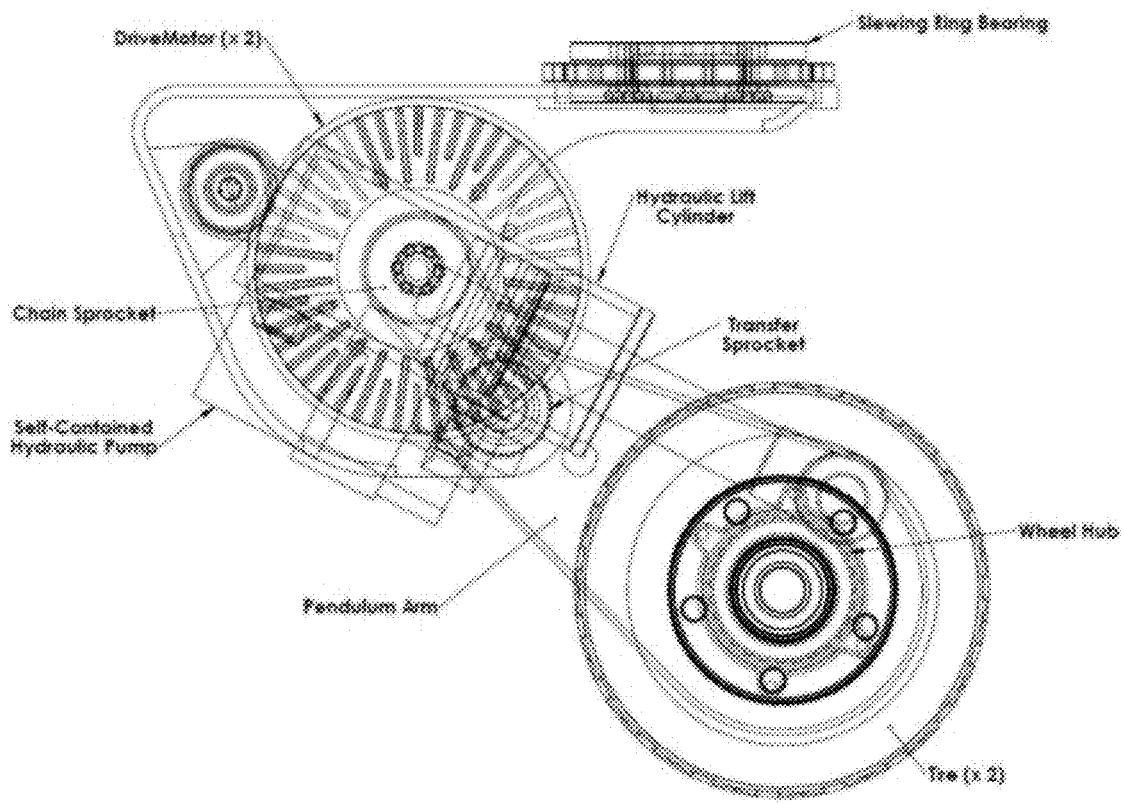
FIG. 9 shows a dual wheel pendulum axle design of various aspects of the disclosure.
Figure 10:
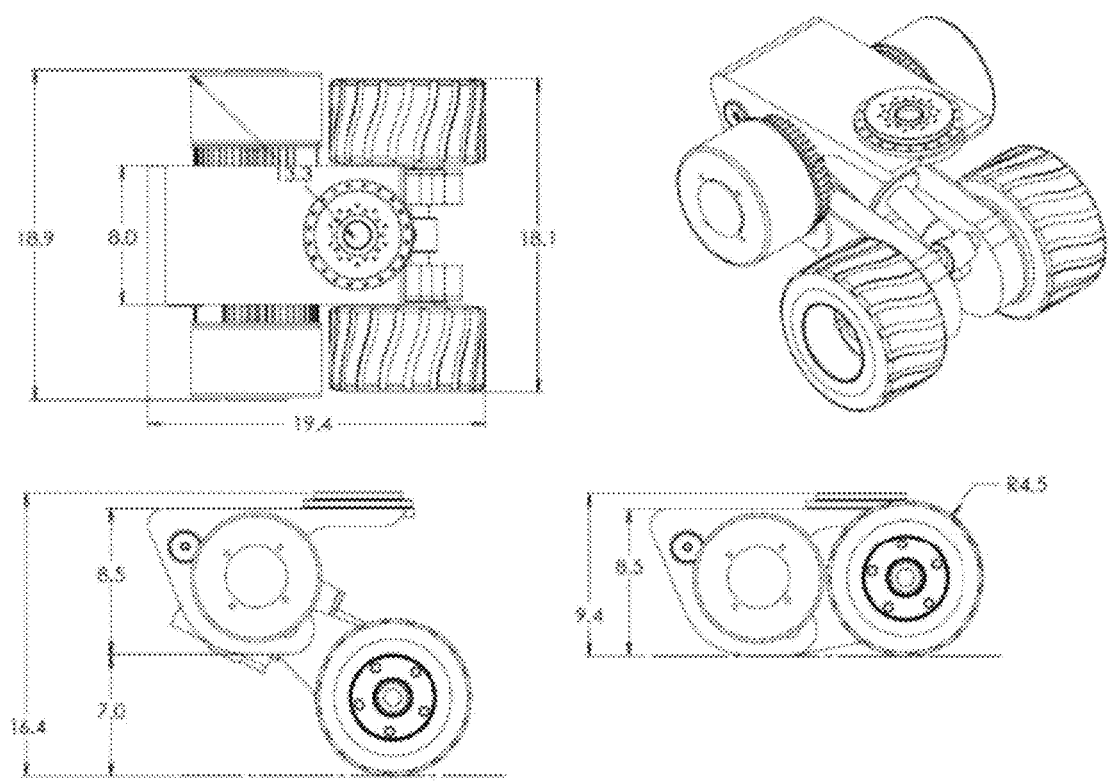
FIG. 10 shows three-view and isometric perspectives of a holonomic drive of various aspects of the disclosure.

The propulsion system for robotic pallets of some embodiments is designed based on a dual wheel pendulum axle concept providing a compact, robust design with holonomic drive capabilities. A line drawing of a dual wheel pendulum axle design is shown in FIG. 9, and FIG. 10 presents three-view and isometric perspectives of a holonomic drive of various embodiments. The robotic pallet may use four pendulum axle units, shown in FIGS. 5 and 7, providing a total of eight tires to spread the pallet load on aircraft decks.

It should be noted that the systems and devices discussed above are intended merely to be examples. It must be stressed that various embodiments may omit, substitute, or add various procedures or components as appropriate. For instance, it should be appreciated that, in alternative embodiments, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, structures, and techniques have been shown without unnecessary detail in order to avoid obscuring the embodiments.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A robotic pallet apparatus for loading and unloading palletized cargo, comprising:
    a pallet housing;
    at least one drive wheel coupled with the pallet housing;
    a motor coupled with the at least one drive wheel;
    a power source coupled with the motor;
    a controller coupled with the power source and the motor and configured to control the motor and the at least one drive wheel to self-propel the robotic pallet apparatus to autonomously move to a determined location; and
    a holonomic drive configured to move the robotic pallet apparatus with the at least one drive wheel to the determined location, wherein the determined location is space-constrained for the loading and unloading the palletized cargo, and the at least one drive wheel comprises a dual wheel pendulum axle.

2. The robotic pallet apparatus of claim 1, further comprising a positioning and environmental awareness module coupled with the controller, the positioning and environmental awareness module providing information to the controller related to a position of the robotic pallet apparatus.

3. The robotic pallet apparatus of claim 2, wherein the positioning and environmental awareness module comprises one or more of a camera, a positioning module, or a ranging module.

4. The robotic pallet apparatus of claim 3, wherein the camera provides imaging data to the controller, and wherein the controller is further configured to control movement of the robotic pallet apparatus responsive to the imaging data.

5. The robotic pallet apparatus of claim 3, wherein the positioning module comprises a global positioning system (GPS) module.

6. The robotic pallet apparatus of claim 3, wherein the ranging module comprises one or more infrared sensors configured to output range information related to one or more objects.

7. The robotic pallet apparatus of claim 1, wherein the controller is further configured to move the palletized cargo on to or off of a cargo aircraft autonomously.

8. The robotic pallet apparatus of claim 1, further comprising one or more load sensors configured to output a weight of the palletized cargo located on the robotic pallet apparatus.

9. The robotic pallet apparatus of claim 1, wherein the controller is further configured to determine a center-of-gravity (CG) of the palletized cargo.

10. The robotic pallet apparatus of claim 1, wherein the robotic pallet apparatus complies with a 463L cargo handling specification.

* * * * *